Oct. 29, 1963 C. A. LEE 3,109,109

CIRCUIT EMPLOYING NEGATIVE RESISTANCE ASYMMETRICALLY
CONDUCTING DEVICES CONNECTED IN SERIES
RANDOMLY OR SEQUENTIALLY SWITCHED

Filed Aug. 29, 1961

INVENTOR
C. A. LEE
BY David P. Kelley
ATTORNEY

United States Patent Office 3,109,109
Patented Oct. 29, 1963

3,109,109

CIRCUIT EMPLOYING NEGATIVE RESISTANCE ASYMMETRICALLY CONDUCTING DEVICES CONNECTED IN SERIES RANDOMLY OR SEQUENTIALLY SWITCHED

Charles A. Lee, New Providence, N.J., assignor to Bell Telephone Laboratories, Incorporated, New York, N.Y., a corporation of New York Filed Aug. 29, 1961, Ser. No. 134,673
6 Claims. (Cl. 307—88.5)

This invention relates to semiconductor devices and, more particularly, to circuits which utilize negative resistance devices of the current-stable type.

It is well known to workers in the art that certain types of asymmetrically conducting devices such as semiconductor diodes of the p-n-p-n or $n^+n$ type exhibit a current-stable negative resistance region in the forward voltage-current characteristic upon the application of a current of proper magnitude. A principal advantage of such devices is the extreme rapidity with which they switch from a positive resistance state to a negative resistance state and, as a consequence, these devices are particularly useful as high speed switches.

High speed switches are useful in a large number and variety of systems, such as, for example, computers, memory and storage systems, and encoders. In general, in all such systems a large number of switches are required to achieve the desired results, as well as extremely complex circuitry, especially in cases where random or selective switching, as opposed to sequential switching, is desired.

An object of the present invention is to produce a plurality of selective switching operations at high speeds with a circuit of unusual simplicity.

The object of the invention is achieved in an illustrative embodiment thereof in which a plurality of negative resistance asymmetrically conducting devices or diodes are connected in series with a current generator.

It is one feature of the present invention that across each of the devices except the first there is connected a current generator which passes current through its associated device in a direction opposite to the current from the main current generator.

It is another feature of the invention that the current generators connected across the devices generate currents of successively increasing increments. Thus, the current generator of the second device of the series generates a current $\Delta I$ which passes through the device in the reverse direction. That is to say, it effectively biases the device in the reverse direction. The current generator for the third device generates a current $2\Delta I$, the current generator for the fourth device generates a current $3\Delta I$, and the current generator for the $n$th device generates a current $(n-1)\Delta I$, where $\Delta I$, as will be more fully explained hereinafter, is the current necessary to bias the device to the center of the negative resistance region.

It is still another feature of the present invention that the main current generator produces step currents in increments $\Delta I$ under the influence of an external control.

It is a still further feature of the present invention that signals are applied to the land portion of the steps of the step current generator.

Figure 1:
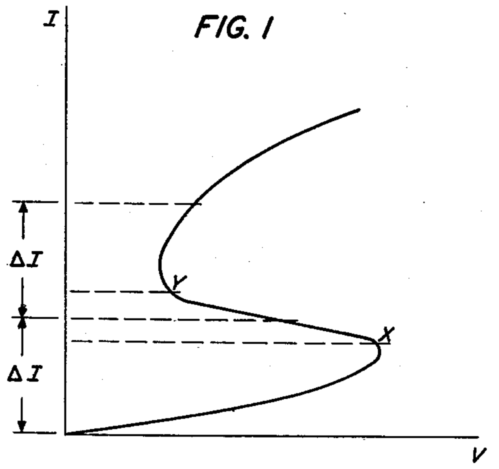
Figure 2:
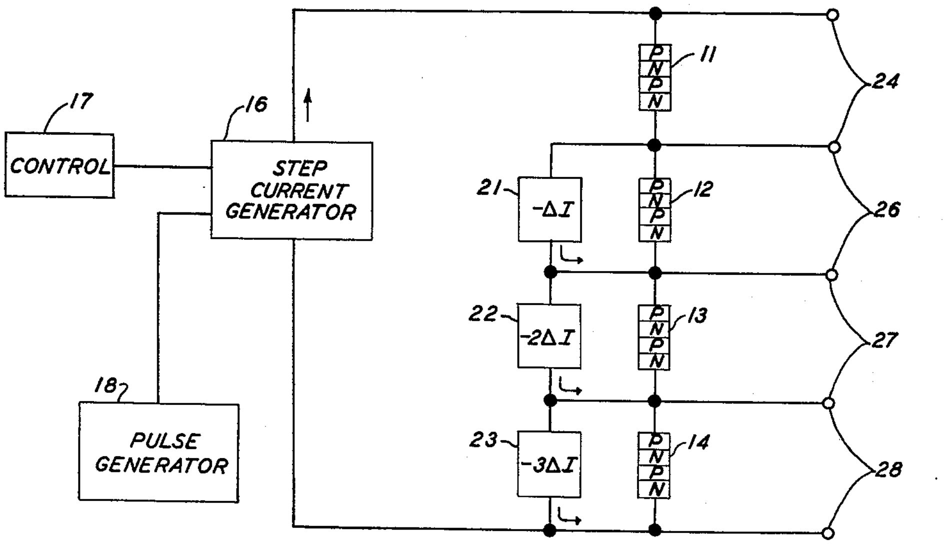

The invention will be more fully understood from the following detailed description taken in conjunction with the accompanying drawing, in which:

FIG. 1 is a diagram of the voltage-current characteristic of a typical p-n-p-n negative resistance diode; and FIG. 2 is a diagrammatic view of an exemplary circuit utilizing the present invention.

Turning now to FIG. 1, there is shown the voltage-current characteristic of a typical negative resistance diode of, for example, the p-n-p-n type, where the abscissa represents the voltage V across the diode and the ordinate represents the current I through the diode. It can be seen from FIG. 1 that when the current I is zero, the voltage is zero. As the current increases, initially the voltage increases also, and the diode acts as a positive resistance until the point X is reached. When the current is of the magnitude indicated by point X, any further increase in current will produce a rapid decrease in voltage until the point Y is reached, at which point the voltage again increases with increasing current. Between points X and Y, the device exhibits a negative resistance for values of current between these two points, but for all other values of current, the resistance is positive. Because of this change in the conduction state, diodes of this type are quite useful in high speed switching arrangements. However, as pointed out in the foregoing, where selective switching or random switching is desired, the implementing circuitry becomes quite complex.

In FIG. 2 there is depicted a switching arrangement embodying the principles of the present invention for achieving selective switching with a minimum of circuit complexity. The circuit of FIG. 2 comprises a plurality of asymmetrically conducting devices 11, 12, 13, and 14, having a negative resistance characteristic as depicted in FIG. 1. Devices 11, 12, 13, and 14 are shown in FIG. 2 as being p-n-p-n diodes, but it is to be understood that any of a number of other types of devices having a $V-I$ characteristic as depicted in FIG. 1 might be used.

Diodes 11, 12, 13, and 14 are connected in series with each other and with a main current generator 16. Current generator 16 produces a stepped current output, the magnitude and duration of which may be controlled as from a control element 17. Current generator 16 may take any one of a number of forms well known to those skilled in the art. In its simplest form, it may be a direct current source having a plurality of different current outputs, the outputs being switched sequentially under the influence of control circuit 17 to produce incremental increases in current. It may also take the form, for example, of a tetrode vacuum tube with a capacitor connected between the control grid and ground, the capacitor being shunted by a clamping diode. If control circuit 17 is a pulse generator producing a string of pulses, such as a multivibrator, for example, each successive pulse places an additional charge on this capacitor, and an incremental increase in plate current of the tetrode until the clamping level is reached and the capacitor discharged. The output of generator 16 is a current which increases in steps. Control element 17 is intended to be representative of a large number of possible control circuits. For example, element 17 may be representative of other circuitry wherein switching signals are generated, or it may be a timing or clock circuit. For illustrating the operation of the circuit of FIG. 2, a pulse generator 18 is shown connected to current source 16. Pulse generator 18 may be any one of a number of such devices, known to workers in the art, such as a multivibrator. If generator 16 is a tetrode, the output of generator 18 may be applied to this second grid thereof and hence superimposed upon the step current output. In a similar manner, generator 18 may represent a source of signals or other form of modulating intelligence which will be superimposed upon the step output of generator 16. The pulses generated by generator 18 and applied to generator 16 are manifested at the output of generator 16 as current pulses superimposed upon the current "steps" produced in generator 16. In FIG. 1, it can be seen that if a current increment ΔI is applied to the diode, the device will be biased or operating in its negative resistance region, whereas a current increment 2ΔI will cause the device to operate in the positive resistance region. In the circuit arrangement of FIG. 2, a generator 16 is designed to produce current steps in increments of ΔI, upon which the pulses are superimposed.

Connected in parallel with each of diodes 12, 13, and 14 are current generators 21, 22, and 23. Generator 21 generates a current ΔI which is applied to diode 12 in a direction opposite to the current of the main generator 16. In like manner, generator 22 generates a current 2ΔI which is applied to diode 13 in the reverse direction and generator 23 generates a current 3ΔI which is applied to diode 14 in the reverse direction. Where more than four diodes are used, the associated current generator of the $n$th diode generates a current $(n-1)\Delta I$. In their simplest form, current generators 21, 22, and 23 may simply be batteries, each having a high resistance in series therewith. Of course, these generators may take any one of a number of other forms known to workers in the art.

Connected to the diodes 11, 12, 13, and 14 are output channels 24, 26, 27, and 28, respectively, which, as will be more apparent hereinafter, transmit output signals indicative of the conduction states of the several diodes.

In operation, when generator 16 produces a current ΔI, diode 11 will be in its negative resistance state, but the other diodes, because of the bucking action of the current from their associated current generators and the current from generator 16, will be in a positive resistance region. If the current from generator 16 is increased from ΔI to 2ΔI, diode 12 has a net current of ΔI passing therethrough in the forward direction and hence is in its negative resistance region, while diode 11 has a current 2ΔI passing therethrough and is in a positive resistance region. As the current from generator 16 is increased by successive increments ΔI, successive diodes are switched to their negative resistance state while the preceding diode is switched to a positive resistance state.

In the circuit of FIG. 2 this switching action is utilized as follows: Assume, for example, that current generator 16 has an output ΔI. Under this circumstance diode 11 is the only diode operating in its negative conducting region. A control signal from control source 17 causes generator 16 to produce an output current of 4ΔI. When this occurs, diode 14 operates in its negative conducting region whereas diodes 11, 12, and 13 are in the positive resistance region. A pulse from pulse generator 18 superimposed upon the 4ΔI current output of generator 16 appears at each of output channels 24, 26, and 27 as a positve pulse. However, at channel 28 it appears as a negative pulse. If now the control circuit 17 causes current generator 16 to produce an output current 3ΔI and a pulse from pulse generator 18 is superimposed upon this current, diode 13 produces a negative pulse in output channel 27 whereas the remaining channels produce positive pulses. Thus, it can be seen that under the influence of a control signal from 17 the circuit of FIG. 2 can be made to switch rapidly from one channel to another, the switching being manifested by a change in polarity of the output pulse. If the various output channels are connected to circuitry which responds only to negative pulses, then only the circuit connected to the output channel whose diode is in its negative resistance region is activated or switched on. On the other hand, the negative pulse may be used to switch a circuit off while the remaining circuits stay turned on. It is clear that the phase reversal produced in one of the output channels can be used in a variety of ways, the example here given being merely for purpose of illustration.

In the foregoing the selection of the particular diode to be in its negative resistance region was governed by the amount of current produced by current generator 16. Where the pulse voltage from pulse generator 18 is sufficiently high, the sum of the pulse current and the generator current may be used to determine the particular diode to be in its negative resistance region. It can also be seen that the circuit of FIG. 2 could be modified to measure input pulse magnitudes by utilizing the current magnitude of the input pulse itself to determine which of the diodes is to be in its negative resistance region. It can be seen that the circuit of FIG. 2 permits selective switching under the influence of control signals from control source 17. It can readily be appreciated, however, that sequential switching can be achieved if desired by having current generator 16 produce a uniformly increasing step current, each step being an increment of current ΔI. With such an arrangement an intelligence signal may be sampled and the samples applied to each of the output channels in turn. For such a sampling circuit, the signal to be sampled is applied to the current generator 16 in place of the pulses from pulse generator 18.

In the foregoing, the arrangement of the present invention has been shown to depend upon a change in current to produce a change in voltage, which voltage change is detected and utilized. It is possible to produce high speed switching operations utilizing devices and circuits which depend upon a change in voltage to produce a change in current. Such devices are the subject of my copending application Serial No. 134,679, filed August 29, 1961.

It is to be understood that the foregoing is intended to be illustrative of the principles of the invention. Various modifications and variations may occur to workers in the art without departure from the spirit and scope of the invention.

What is claimed is:

1. A switching circuit comprising a plurality of negative resistance asymmetrically conducting devices connected in series with a step current generator, a current generator connected across successive ones of the devices in the series for reverse biasing the devices with successively increasing current increments, each current increment being equal to the magnitude of one step of the step current generator, and output means connected to each of said devices for producing an output signal indicative of the conduction state of the device.

2. A switching circuit as claimed in claim 1 and further including means for controlling the magnitude of the output of the step current generator.

3. A switching circuit as claimed in claim 2 and further including means for impressing a signal upon the output of the step current generator.

4. A switching circuit as claimed in claim 3 wherein said means for impressing a signal upon the output of the step current generator comprises a pulse generator.

5. A switching circuit comprising a plurality of negative resistance asymmetrically conducting devices connected in series with a step current generator, a current generator connected across each of the devices except the first in the series for reverse biasing each of the devices with successively increasing current increments, each current increment being equal to the magnitude of one step of the step current generator, said current increment being of a magnitude to drive an asymmetrically conducting device into its negative resistance state, control means for determining the magnitude of the output of the step current generator, means for superimposing a signal upon the output of the step current generator, and output means connected to each of said devices for producing an output signal indicative of the conduction state of the device.

6. A switching circuit as claimed in claim 5 wherein said devices are diodes of the p-n-p-n type.

References Cited in the file of this patent

UNITED STATES PATENTS

| | | |
|---|---|---|
| 2,855,524 | Shockley | Oct. 7, 1958 |
| 2,912,598 | Shockley | Nov. 10, 1959 |
| 2,966,599 | Haas | Dec. 27, 1960 |
| 2,981,849 | Gobat | Apr. 25, 1961 |